US010510056B2

(12) United States Patent
Carter et al.

(10) Patent No.: US 10,510,056 B2
(45) Date of Patent: Dec. 17, 2019

(54) METHOD AND SYSTEM FOR MULTIPLE PAYMENT APPLICATIONS (75) Inventors: Ronald D. Carter, Cambs (GB); Simon Phillips, York (GB); Jonathan Main, Hampshire (GB)

(73) Assignee: Mastercard International Incorporated, Purchase, NY (US)

( * ) Notice: Subject to any disclaimer, the term of this patent is extended or adjusted under 35 U.S.C. 154(b) by 687 days.

(21) Appl. No.: 13/287,640

(22) Filed: Nov. 2, 2011

(65) Prior Publication Data

US 2013/0110719 A1 May 2, 2013

(51) Int. Cl.
*G06Q 20/40* (2012.01)
*G06Q 20/20* (2012.01)
*G06Q 20/32* (2012.01)
*G06Q 20/34* (2012.01)
*G06Q 20/36* (2012.01)
*G06Q 20/38* (2012.01)

(52) U.S. Cl.
CPC ....... *G06Q 20/204* (2013.01); *G06Q 20/3226* (2013.01); *G06Q 20/3227* (2013.01); *G06Q 20/3229* (2013.01); *G06Q 20/3278* (2013.01); *G06Q 20/351* (2013.01); *G06Q 20/3552* (2013.01); *G06Q 20/363* (2013.01); *G06Q 20/385* (2013.01)

(58) Field of Classification Search
CPC ... G06Q 20/405; G06Q 20/40; G06Q 20/4016
USPC .......................................................... 705/44
See application file for complete search history.

(56) References Cited

U.S. PATENT DOCUMENTS

| 2009/0094125 | A1* | 4/2009 | Killian et al. | 705/17 |
| 2009/0307132 | A1* | 12/2009 | Phillips | 705/41 |
| 2010/0223186 | A1* | 9/2010 | Hogan et al. | 705/71 |
| 2010/0228668 | A1* | 9/2010 | Hogan et al. | 705/41 |
| 2012/0011063 | A1* | 1/2012 | Killian et al. | 705/41 |

* cited by examiner

*Primary Examiner* — Hai Tran
(74) *Attorney, Agent, or Firm* — Buckley, Maschoff & Talwalkar LLC (57) ABSTRACT

Methods and systems for receiving a proximity payment account number (PPAN) with payment transaction data for a payment transaction from a mobile device, the PPAN selected from at least one PPAN; mapping the received PPAN to a primary account number (PAN); generating an authorization request for the payment transaction based on the PAN and the payment transaction data; receiving an authorization response message; and providing an output including the authorization response message and the PPAN.

19 Claims, 9 Drawing Sheets

METHOD AND SYSTEM FOR MULTIPLE PAYMENT APPLICATIONS

BACKGROUND

The use of credit cards, debit cards, stored values cards, electronic wallets, and other means of payment relying on payment account numbers as opposed to cash is ever-increasing among consumers. In some contexts, the proliferation of paperless payment transactions is becoming a preferred method of conducting many types of payment transactions, including small purchase amount transactions as well as larger purchases. The convenience of paperless payment transactions is attractive to many account holders.

Proximity payment devices (otherwise referred to herein as contactless payment cards or devices), such as the PayPass® payment device issued pursuant to standards developed by MasterCard International Incorporated, are becoming more widely used. PayPass® proximity payment devices (as well as a number of other proximity payment device schemes) follow standards, such as ISO standards and the EMV standards (available at www.emvco.com). The EMV standards set forth a security infrastructure in which payment device issuers create secure keys that are used to uniquely identify payment devices issued by them.

In a number of contexts, a proximity payment device may be implemented in a mobile device, such as, for example, a mobile telephone. As such, a payment account issuer may traditionally have a need to deploy an account number to the mobile device of the payment account number user (e.g., a credit card cardholder) so that the user may use the payment account number in a payment transaction. Deploying a payment account number to a mobile device in a timely, efficient, and secure manner may require great effort on the issuer's part.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, wherein.

DETAILED DESCRIPTION

For simplicity and ease of exposition, a number of terms are used herein. For example, the terms "proximity payment device", "payment device", "payment card" or "contactless payment card" are used to refer to payment devices that use either radio frequency or infrared technology to allow a device to communicate with a terminal to conduct a payment transaction. For example, the terms may be used to refer to devices that are compliant with ISO/IEC 14443 Standard, ISO/IEC 18000 standard, or the NFC standards including ISO/IEC 18092/ECMA 340 and ISO/IEC 21481/ECMA 352. As a particular example, a "proximity payment device" may be further compliant with both the ISO/IEC 14443 Standard and the "PayPass" standards promulgated by MasterCard International Incorporated. A proximity payment device may have any of number of form factors. For example, a device may be formed in the shape of a traditional credit card (with an antenna and one or more chips embedded in a substrate) or a mobile computing device such as a mobile phone including a RFID or NFC chip.

As used herein, the term "reader" or "terminal" is used to refer to a proximity coupling device that is capable of interrogating and reading data from a proximity payment device. In some embodiments, the reader may be incorporated into, or part of, the terminal. In some embodiments, the reader may be separate from (but in communication with) the terminal. A number of different types of terminals may be used, including, for example, traditional point of sale ("POS") terminals having contactless readers, computing devices (such as personal computers, handheld computers, or the like), etc.

In general, and for the purpose of introducing concepts of embodiments of the present disclosure, a primary account number (PAN) herein may refer to an identifying string of numbers, alpha-numerics, and other indicia referencing or pointing to a source of funds account. The source of funds account may be associated with various types of payment account numbers such as a credit card, a charge card, a debit card, a stored value card, a bank account, a savings account, a checking account, a money-market account, and other transactional accounts and demand deposit accounts, a rewards program, a loyalty program, a remittance account, and other types of accounts. In some aspects, a financial institution or other entity acting on behalf of a financial institution (i.e., an issuer) may issue a credit, charge, or debit card. Such card issuers may authorize transactions on issued and outstanding cards, provide settlement services, and provide periodic, (e.g., monthly) activity statements to account holders of the issued cards.

Figure 1:
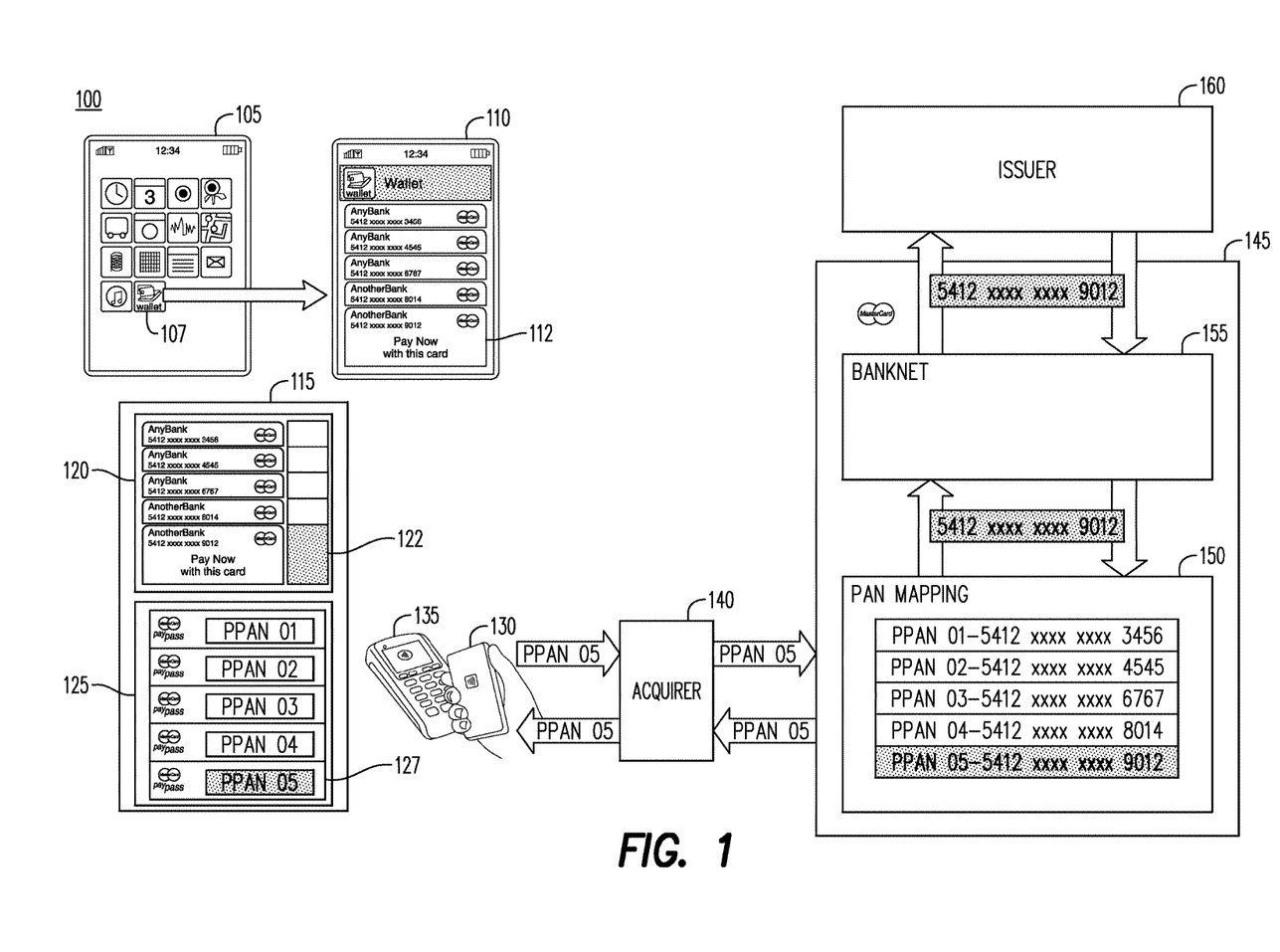
FIG. 1 is an illustrative depiction of a system, according to some embodiments herein.

FIG. 1 is an illustrative block diagram of a system 100 that includes illustrative devices and systems that may be utilized for supporting multiple payment applications on a mobile device using a proximity payment account number (PPAN) mapping mechanism. In some aspects, a number of communication flows are also shown between the devices and systems of FIG. 1 to illustrate exemplary operations facilitated by system 100.

It should be appreciated that the number, type, and arrangement of the devices and systems shown in FIG. 1, like other illustrative figures herein, may vary and do not indicate a fixed configuration of the devices and systems that may be used to implement the methods and processes disclosed herein. Additionally, the illustrative communication flows shown in FIG. 1, and other drawings and flow diagrams herein, are not meant to convey either an exhaustive representation or fixed order of communication messages, requests/responses, and operations between the disclosed devices and systems.

System 100 includes a mobile device 105 having a user interface (UI) for presenting information to a user and receiving user inputs from a user. In the example of mobile device 105, the UI may include, as shown, a graphical user interface presenting a number of graphical elements, including an icon representing a wallet application or "app" 107. In some embodiments, mobile device 105 may be a mobile telephone, a personal media player, a tablet, a laptop, a personal computer, and other computing devices including, in general, a processor for executing program instructions. Mobile device 105 may generally include a processor for executing program instructions and code that may be stored on any tangible media, including a medium either integrated or removably interfaced with the mobile device 105. In some aspects, wallet app 107 may be provided as a built-in app delivered with mobile device 105 from a device manufacturer and/or a service provider (e.g., a mobile phone carrier). In some embodiments, wallet app 107 may be obtained from a third-party such as an "app store", an application developer, a financial institution (e.g., a payment account issuer or service provider), and other entities.

UI 110 may be invoked by selecting or opening wallet app 107. Wallet app 107 may be opened in response to a user input, where mobile device 105 may accept touch, voice, and motion based user inputs via one or more keys, touch screens, microphones, and other sensors (e.g., accelerometers, optical sensors, gyroscopes, etc.). In some aspects, these and other input devices of mobile device 105 (not shown) may combine, with or without executable program instructions, to provide location or context based activation and operation of the processes discussed herein.

As shown at UI 110, wallet app 107 presents a display including multiple graphical representations of payment devices. For example, each of the five payment devices depicted in UI 110 may represent a credit card type primary account issued to a user by an issuer financial institution. In the example of UI 110, payment device representation 112 is displayed in a more prominent manner than the other four payment device representations in UI 110 to indicate that this payment device has been selected by a user. In some instances, a user may select a payment device representation presented in a UI to indicate the user's choice regarding a payment device to use as a payment device in a future payment transaction. In some aspects, a user may select the particular payment device to use in a future (e.g., next) payment transaction before or in conjunction with each payment transaction. In some embodiments, the user may select the particular payment device to use in one or more future (e.g., next) payment transactions before or in conjunction with a first one of the one or more future transactions is commenced and that selected payment device will be used for the one or more future payment transactions. In some aspects, the payment device selected (e.g. 112), either by the user or as a function of wallet app 107, may be a default payment device which will be used for payment transactions unless another payment device is selected by the user, wallet app 107, or another entity such as an issuer based on a rule associated with the wallet app and/or the issuer of the PAN associated with the selected payment device representation at mobile device 105.

A logical representation of the wallet app stored at mobile device 105 is shown at secure element 115. As illustrated, secure element 115 includes five payment device representations at 120. Each of the payment device representations 120 corresponds to one of five proximity payment account numbers (PPANs) 125. In the example of FIG. 1, payment device representation 122 corresponds to or is associated with PPAN 127. In some aspects, the selection of payment device 112 by a user via UI 110 corresponds to selecting PPAN 127 for use in a future payment transaction.

In some aspects, PPANs 125 are deployed to mobile device 105 by an issuer of the payment device representations 120 stored at mobile device 105 or an entity such as a service provider acting on behalf of the issuer. In some embodiments herein, PPANs 125 are enabled for use in contactless payment systems using proximity payment devices and proximity payment readers to securely exchange purchase transaction data. Furthermore, the PPANs herein may be "pre-personalized" such that they are enabled to initiate a contactless payment transaction. The "pre-personalized" PPANs may be issued by an issuer and delivered to the user with wallet app 107 with the purchase or acquisition of mobile device 105 and/or wallet app 107. As used herein, a PPAN is not the same as a primary account number (PAN) issued by a financial institution.

In some embodiments, a payment device, as enabled by wallet app 107 operating thereon, cannot be used in an authorization and settlement process of a payment transaction until it has been both pre-personalized and personalized. As used herein, a "pre-personalized" device or system refers to a device or application that results from a pre-personalization process. A "pre-personalized" payment device refers to a device having a payment application operating thereon, including payment application program instructions and data (including, e.g., key data and a chip serial number), but it may not yet be used to conduct payment transactions until it has been "personalized". A "pre-personalized" device or application may be distributed to a mobile device, either at an initial deployment of the mobile device or at any time thereafter in the lifecycle of the mobile device.

As used herein, the term "personalized" device or application refers to a payment device or application that has been both "pre-personalized" and personalized so that it has been configured for use pursuant to embodiments of the present disclosure. Pursuant to some embodiments, "pre-personalized" devices and applications may be deployed to mobile devices and "personalized" for use in a payment transaction by a PPAN-PAN mapping system or mechanism by an issuer or an entity acting on behalf of the issuer of the PAN. Further details regarding the PPAN-PAN mapping system or mechanism will be provided below.

The pre-personalization of a payment device or application such as wallet app 107 may be performed at (or on behalf of) a PAN issuer. The pre-personalization may be performed on an application (i.e., app) at the issuer (or at a device manufacturer or mobile device service carrier) and then distributed to mobile device 105.

In general, any device or system that allows a payment application (e.g., wallet app 107) to be loaded onto the device or system may comprise a payment device herein. The payment application may be a software application that allows the PPAN of wallet app 107 to operate as a payment device to at least initiate a contactless payment transaction. In some embodiments, the payment applications loaded onto devices of the present disclosure are applications that allow the payment devices to function as credit, debit, pre-paid, or stored value cards. As a specific illustrative example, a payment application such as wallet app 107 loaded onto a mobile device herein may be a PayPass® payment application.

In some embodiments herein, an issuer causes pre-personalization data to be generated and stored in a secure element 115 (e.g., a RFID or NFC chip, a removable SIM (subscriber identity module), or other circuitry) of the mobile device. The nature of the pre-personalization data to be generated and stored will depend, for example, on the issuer and the payment application that is stored on mobile device 105. However, as an illustrative example in which wallet app 107, and thus mobile device 105, may be configured to operate as a PayPass® payment device, the pre-personalization data may include requisite data such as, for example, a key identifier, a version number of the key, and a chip serial number. In some aspects, the pre-personalization data may not include certain payment device "track" data including, for example, a PAN and other account information that is needed to allow the payment device to be fully used in payment transactions.

Once the payment device and application has been pre-personalized, the pre-personalized payment application may be delivered to mobile devices. In some instances, the pre-personalized payment applications may be deployed to mobile devices from an issuer or others acting on behalf of the issuer, including but not limited to a mobile device carrier.

Returning to FIG. 1, it may be assumed that wallet app 107 is deployed "pre-personalized" with multiple PPANs as discussed above and that a user has selected one of the payment device representations presented in UI 110, such as "card" 112, to initiate a payment transaction. In the example of FIG. 1, card 112/122 is associated with PPAN 127. Wallet app 107 may operate to activate the selected card 112/122 in response to the user's selection of the card. Additionally, wallet app 107 may operate to deactivate the non-selected cards to, for example, ensure that only the selected card may be used in a future (e.g., next) payment transaction. In some aspects, the association(s) correlating "cards" in wallet app 107 with corresponding PPANs may be accomplished by an issuer that deployed the "pre-personalized" wallet app 107, whether at an initial delivery of the wallet app or at some later time such as an updating or editing of the wallet app.

In an illustrative use case, after selecting card 112 the user may tap or otherwise present mobile device 130 within an operational range of a merchant's point of sale (POS) terminal 135 with the purpose of using the mobile device as a contactless payment device wherein card 112 is used as the payment device for a payment transaction. Upon tapping mobile device on POS terminal 135 a communication link is established between mobile device 130 and POS terminal 135. The PPAN 127 associated with the selected card 112/122 is sent to merchant's acquirer 140 from the mobile device. Acquirer 140 proceeds to route the PPAN and transaction data to a payment network provider 145. In some embodiments, the payment network provider 145 may be MasterCard International. Payment network provider 145 may provide or support a PPAN-PAN mapping service 150. Mapping service 150 may operate to translate the PPAN 127 to the particular and actual PAN associated with the user's actual payment card.

In some embodiments, the PPAN-PAN mapping functionality embodied by mapping service 150 may be implemented, as least in part, by a database record such as, for example, a lookup table that associates an actual PAN issued by an issuer to a user and a PPAN deployed to a mobile device. It is submitted that the specific data structure used to facilitate and support the PPAN-PAN mapping service 150 may be any suitable data structure compatible with other aspects of the processes and methods herein.

The PAN determined by the mapping service 150 may be included in an authorization request generated and sent from mapping service 150 to issuer 160 via payment network 155. The authorization request may include additional information such as payment transaction details (e.g., merchant details, a purchase amount, a category of goods and service being purchased, etc.), as is understood for authorization requests. In some embodiments, the authorization request may be generated by the entity providing mapping service 150 (e.g., MasterCard International) and the payment network 155 used for routing the authorization request to issuer 160 may include the Banknet communication network operated by MasterCard International.

Issuer 160 determines whether the authorization request including the PAN is approved or rejected, based on the PAN, other payment transaction details, and applicable rules of the issuer. An authorization response message is sent from issuer 160 to payment network provider 145. The authorization response includes the PAN and an indication of whether the authorization request was approved or denied.

Pursuant to some embodiments, the authorization request processing may be performed using standard payment processing techniques (e.g., the authorization request and the authorization response are formatted, transmitted and processed using existing payment network messaging techniques).

Upon receipt of the authorization response, payment network provider 145 proceeds, via mapping service 150, to translate the PAN received with the authorization response to the corresponding PPAN. The PPAN is then provided as an output with the authorization response from payment network provider 145 and routed to POS terminal 135 via the merchant's acquirer 140.

In accordance with FIG. 1, the PPAN is exchanged between the merchant (i.e., POS 135) and acquirer 140 without the PAN being deployed to mobile device 130 or being communicated to or through the merchant and/or the acquirer.

Figure 2:
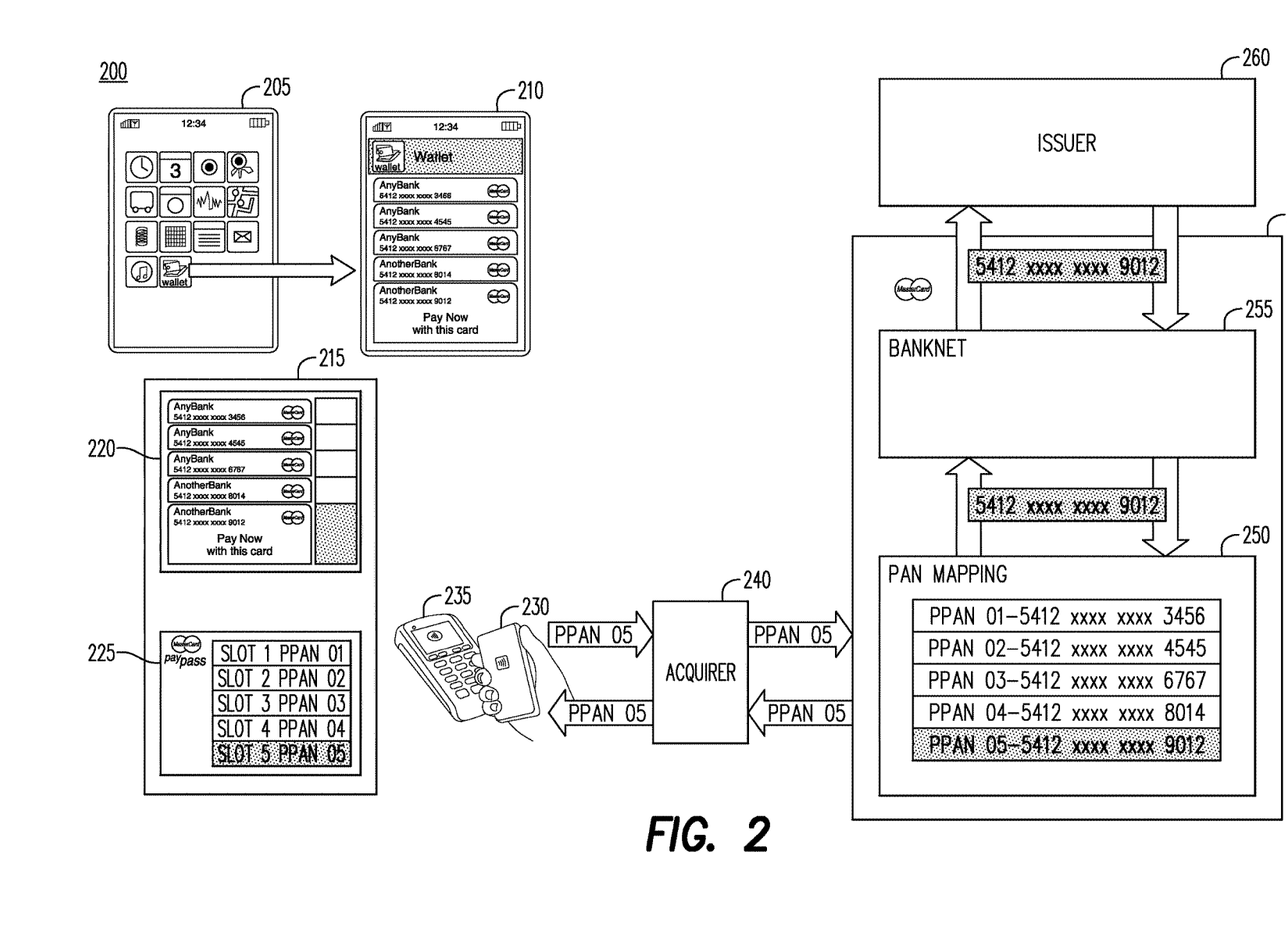
FIG. 2 is an illustrative depiction of another system, according to some embodiments herein.

System 200 in FIG. 2 is, in some aspects, similar to system 100 of FIG. 1. For example, system 200 includes a mobile device 205 having a UI 210 for presenting graphical UI elements and for accepting user input. In a departure from FIG. 1, the secure element 215 contains multiple "cards" in wallet 220 and a single payment application 225 having multiple slots to accommodate the multiple PPANs corresponding to the multiple payment device representations (i.e., "cards"). Thus, the multiple PPANs stored at a mobile device may each be embodied as a distinct application as shown in FIG. 1 or implemented as a single application that supports the multiple PPANs as shown in FIG. 2.

Continuing to reference FIG. 2, a PPAN corresponding to a card selected by a user via mobile device 230 is presented to POS terminal 235 for use in a payment transaction. The PPAN and other payment transaction data are routed to the merchant's acquirer 240 from POS terminal 235. Acquirer 240 proceeds to route the PPAN and transaction data to a payment network provider 245, which may be, for example MasterCard International. Payment network provider 245 may provide or support a PPAN-PAN mapping service 250. Mapping service 250 may operate to translate the received PPAN to the PAN associated with the user's selected actual payment card. Mapping service 250 may employ a lookup table or other data translation mechanism to effectuate the mapping of the received PPAN to the user's PAN.

The PAN determined by the mapping service 250 may be included in an authorization request generated and sent from mapping service 250 to issuer 260 via payment network 255. In some embodiments, PPAN-PAN mapping service 250 and payment network 255 may be provided by a same entity and/or an integrated device or system. The authorization request may include additional information such as payment transaction details (e.g., merchant details, a purchase amount, a category of goods and service being purchased, etc.), as is understood for the processing of authorization requests. Issuer 260 may proceed to determine whether to approve or decline the authorization request and further provide an indication of an authorization approval or denial in an authorization response.

Upon receipt of the authorization response, payment network provider 245 proceeds, via mapping service 250, to translate the PAN received with the authorization response to its corresponding PPAN. The PPAN is then provided as an output with the authorization response from payment network provider 245 and routed through the merchant's acquirer 240 to POS terminal 235.

Figure 3:
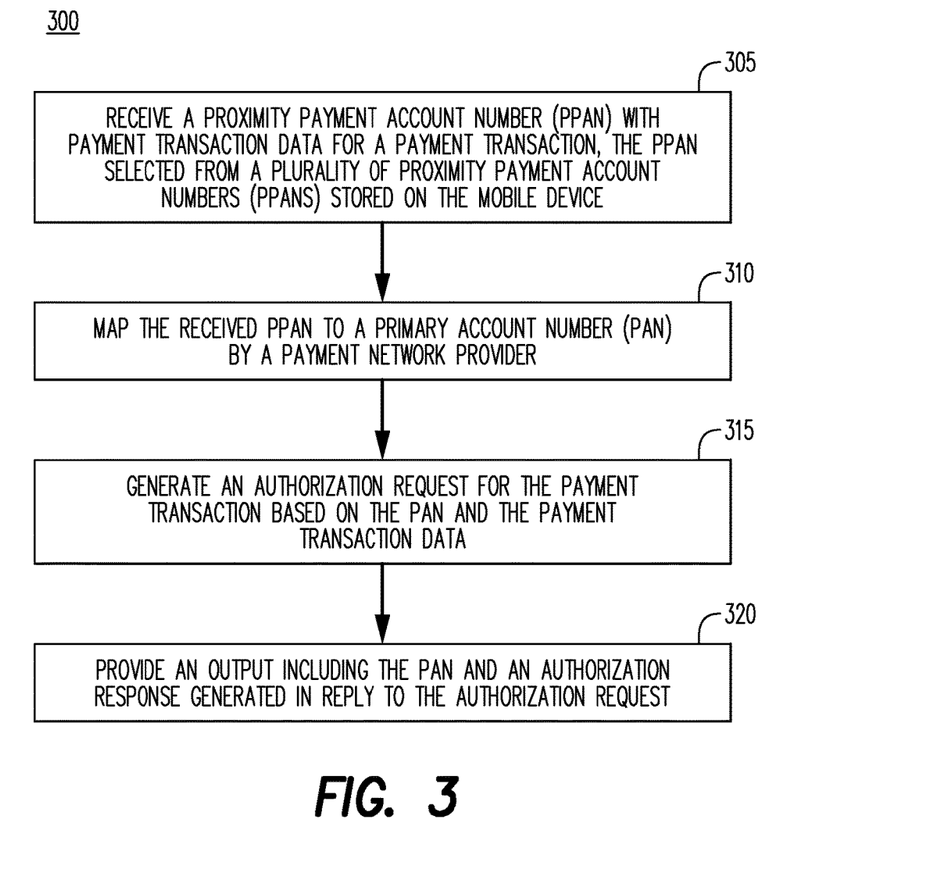
FIG. 3 is flow diagram illustrating a process in accordance with some embodiments of FIGS. 1 and 2.

FIG. 3 is an illustrative flow diagram of a process 300 according to some embodiments herein. Process 300 may be implemented by the systems depicted in FIGS. 1 and 2, as well as other systems and devices not specifically shown therein. At operation 305, a PPAN is received along with payment transaction data associated with a payment transaction from a mobile computing device by a payment network provider. In some embodiments, the payment transaction may be initiated by a user at a merchant's POS interface or terminal, where the user presents a selected "card" having an associated PPAN to the POS interface or terminal. As disclosed above with respect to FIGS. 1 and 2, the PPAN may be selected from one of multiple PPANs stored at the mobile device.

At operation 310, the PPAN is mapped to, translated to, associated with, or determined to correspond with a specific PAN issued to the user by an issuer. Based on the PAN determined to correspond to the PPAN received with the payment transaction data, an authorization request regarding the payment transaction is generated at operation 315. The authorization request may be routed to and processed by the issuer of the PAN (i.e., the user's account issuer) in a conventional manner to obtain an authorization response.

At operation 320, the authorization response including the PAN may be received from the issuer and the PAN may be translated back to the PPAN included with the payment transaction data. Furthermore, the PPAN may be associated with the authorization response and provided as an output for routing to the merchant's POS. In some aspects, the authorization response may be provided in a message or other data exchange.

Figure 4:
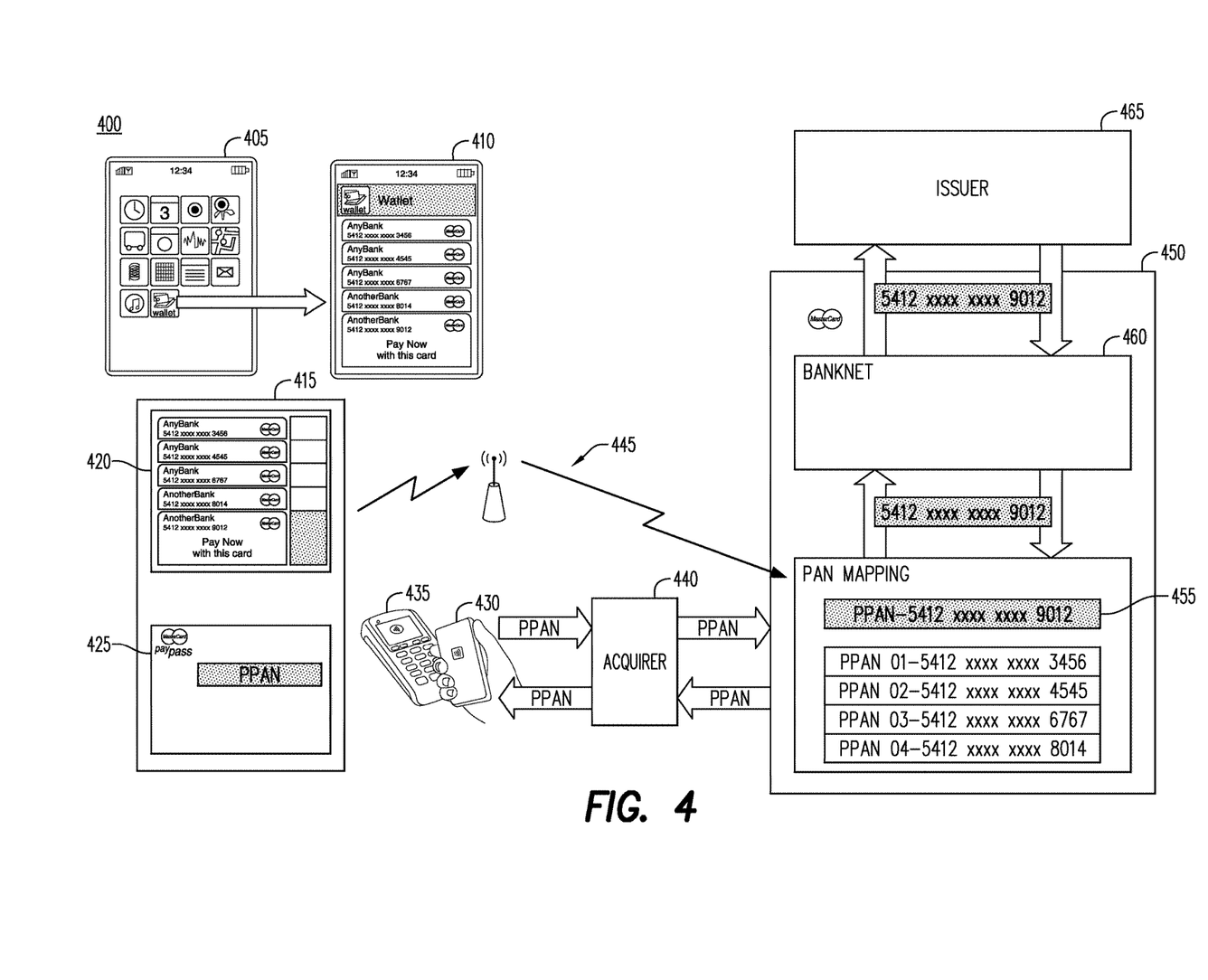
FIG. 4 is an illustrative depiction of a system, according to some embodiments herein.

FIG. 4 is an illustrative depiction of a system 400, in accordance with some embodiments herein. System 400 includes a mobile device 405 having a UI for presenting information to a user and receiving user inputs from the user. In the example of mobile device 405, the UI may include, as shown, a graphical user interface presenting a number of graphical elements, including an icon representing a wallet "app". In some embodiments, mobile device 405 may be any one or more of a mobile telephone, a personal media player, a tablet, a laptop, a personal computer, and other computing devices including, in general, a processor for executing program instructions. In some aspects, the wallet app may be provided as a built-in app delivered with mobile device 405 from a device manufacturer and/or a service provider (e.g., a mobile phone carrier). In some embodiments, the wallet app may be obtained from a third-party such as an "app store", an application developer, a financial institution (e.g., a payment account issuer or service provider), and other entities.

UI 410 may be invoked by selecting or opening the wallet app on mobile device 405 in response to a user input. As shown at UI 410, the wallet app presents a display including multiple graphical representations of payment devices. As shown, each of the five payment devices depicted in UI 410 may represent a credit card or other type of card having a primary account number issued to a user by an issuer. In some instances, a user may select a payment device representation presented in UI 410 to indicate the user's choice regarding a "card" to use as a payment device in a future payment transaction. In some aspects, a user may select the particular payment device to use in a future (e.g., next) payment transaction before or in conjunction with each payment transaction. In some embodiments, the user may select the particular payment device to use in one or more future (e.g., next) payment transactions before or in conjunction with a first one of the one or more future transactions is commenced and that selected payment device will be used for the one or more future payment transactions. In some aspects, the payment device selected, either by the user or as a function of the wallet app, may be a default payment device that will be used for payment transactions unless another payment device is selected by the user, the wallet app, or another entity (e.g., an issuer).

A logical representation of the wallet app stored at mobile device 405 is shown at secure element 415. As illustrated, secure element 415 includes five payment device representations at 420, where each of the payment device representations 420 may be associated with the PPAN 425 for use in a payment transaction.

In the example of FIG. 4, an indication of the particular payment device representation selected for use with a future payment transaction is received by a PPAN-PAN mapping service 455 via a communication link 445. Communication link 445 may include, at least in part, a mobile telephone communication link or other communication link compatible with mobile device 405. In some aspects, other types of communication links may be used to facilitate the processes herein. The communication protocol for communication link 445 may include, in some embodiments, HTTP (Hypertext Transfer Protocol) protocol. The wallet app may operate to communicate with mapping service 455 via communication link 445 to inform mapping service 455 of the "card" to use in a future (e.g., next) payment transaction involving the user. In some aspects, the wallet app communicates the selected "card" (i.e., payment device representation) and the PPAN 425 stored on the mobile device 405 to mapping service 455 prior to an authorization request for a payment transaction. The mapping service may map the received PPAN to the PAN corresponding to the "card" selected at mobile device 405. In some embodiments, the wallet app communicates the indication of the selected "card" and PPAN 425 to mapping service 455 in a short communication session of about less than 5 seconds, preferably less than about 3 seconds in duration.

In accordance with some embodiments herein, the wallet app including PPAN may be stored or provided in a secure element 415 located on or in mobile device 405. The secure element may contain the wallet application "pre-personalized" with PPAN 425. In some aspects, the secure element is deployed "pre-personalized" by an issuer of a PAN. However, in accordance with some aspects herein, including some considerations related efficiency and security, the wallet app may not be "pre-personalized" to include the issued PAN. PPAN 425 may be "pre-personalized" such that is enabled to initiate a contactless payment transaction. Thus, in some embodiments the wallet app may be deployed to a mobile device "pre-personalized" with PPAN 425 for use in future transactions without a need to have a PAN included with the deployment of the mobile app. Furthermore, aspects herein may also alleviate a need to deploy the PAN to the mobile device since the PPAN may be efficiently associated with a PAN by a payment network provider during an authorization process of a payment transaction based on the PPAN included with an authorization request for the payment transaction.

Still referring to FIG. 4, after selecting a desired "card" for a future payment transaction and having such information communicated to mapping service 455 via communication link 445, the user may tap or otherwise present mobile device 430 within an operational range of a merchant's POS terminal 435 for the purpose of using the mobile device as a contactless payment device where the selected "card" is used as the payment source for a payment transaction. Upon tapping mobile device on POS terminal 435 a short range communication link is established between mobile device 430 and POS terminal 435. PPAN 425 is sent to merchant's acquirer 440 from the mobile device. Acquirer 440 proceeds to route PPAN 425 and transaction data to a payment network provider 450. In some embodiments, the payment network provider 450 may be MasterCard International. Payment network provider 450 may provide or support a PPAN-PAN mapping service 455. Mapping service 455 may operate to translate PPAN 425 received with the payment transaction data to the PAN associated with the card previously selected and communicated to the mapping service via communication link 445. PPAN 425 is thereby mapped to the particular and actual PAN associated with the user's actual payment card.

The PAN determined by the mapping service 450 may then be included in an authorization request generated and sent from mapping service 455 to issuer 465 via payment network 460. Issuer 465 determines whether the authorization request including the PAN is approved or rejected, based on the PAN, other payment transaction details, and applicable rules of the issuer. An authorization response message is sent from issuer 465 to payment network provider 450, where the authorization response includes the PAN and an indication of whether the authorization request was approved or denied.

The PAN in the authorization response is translated to the PPAN included in the payment transaction data. The PPAN is further included in an authorization response that is provided as an output from payment network provider 450 and routed to POS terminal 435 via the merchant's acquirer 440.

Figure 5:
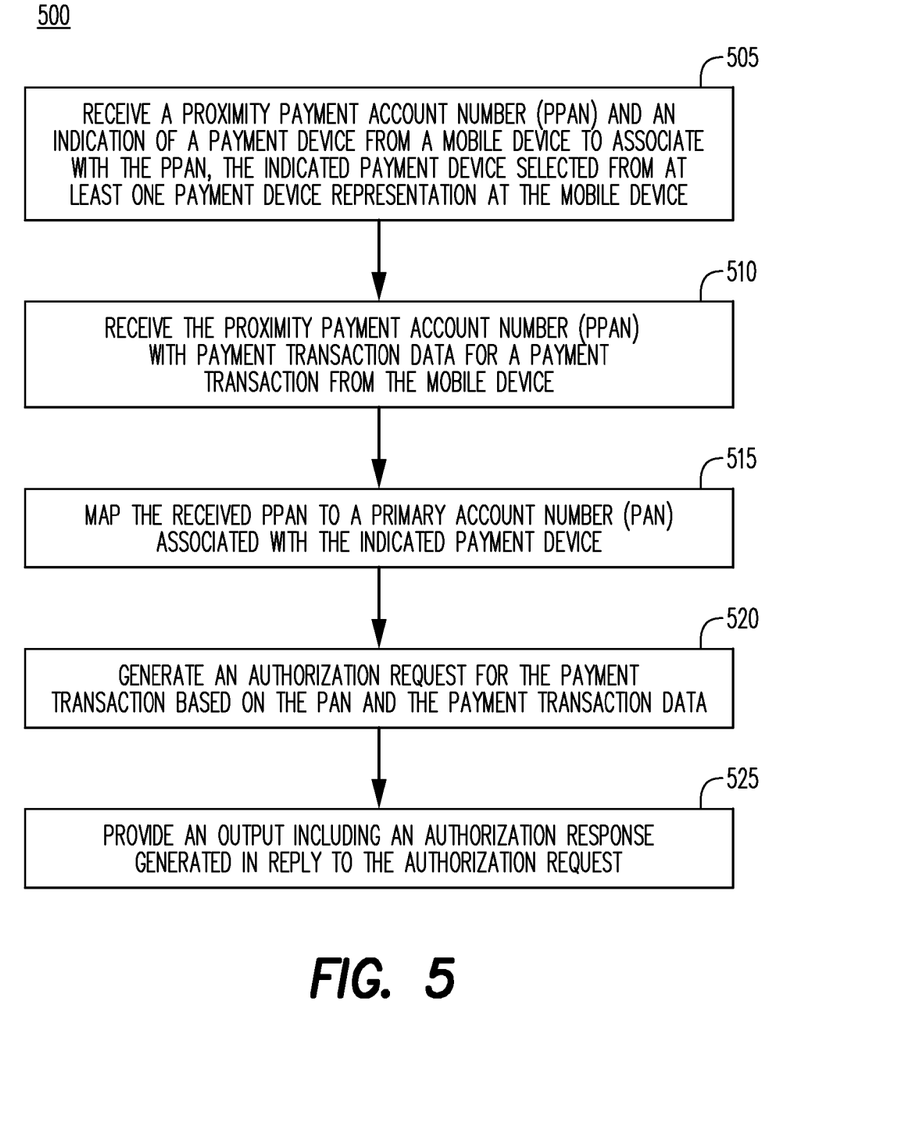
FIG. 5 is flow diagram illustrating a process in accordance with some embodiments herein.

FIG. 5 is an illustrative flow diagram of a process 500 according to some embodiments herein. Process 500 may be implemented by the system depicted in FIG. 4, as well as other systems and devices not specifically shown herein. At operation 405, a PPAN is received along with an indication of a desired payment device (i.e., a "card") to be used in a future payment transaction. In some embodiments, the indication of the desired payment device and the PPAN is received via a communication link from a mobile computing device, such as a mobile telephone network. The indication of the selected "card" and the PPAN may be received by a PPAN-PAN mapping service 455. In some embodiments, the desired payment device may be selected from amongst a plurality of payment devices presented to a user by the mobile device.

At operation 510, the PPAN stored at the mobile device is received in connection with payment transaction data for use in completing the payment transaction. At operation 515, the received PPAN is mapped or otherwise associated with the PAN corresponding to the "card" selected by the user and included in the communication of operation 505.

At operation 520 an authorization request for the payment transaction is generated based on the determined PAN and routed to the issuer of the PAN for approval or denial. In reply to the authorization request of 520, the issuer provides an authorization response that is routed to the PPAN-PAN mapping service that operates to translate the PAN included in the authorization response back to the PPAN included in the payment transaction.

At operation 525, the authorization response including the PPAN may provided as an output of the PPAN-PAN mapping service and routed to the merchant's POS. In some aspects, the authorization response may be provided in a message or other data exchange.

Figure 6:
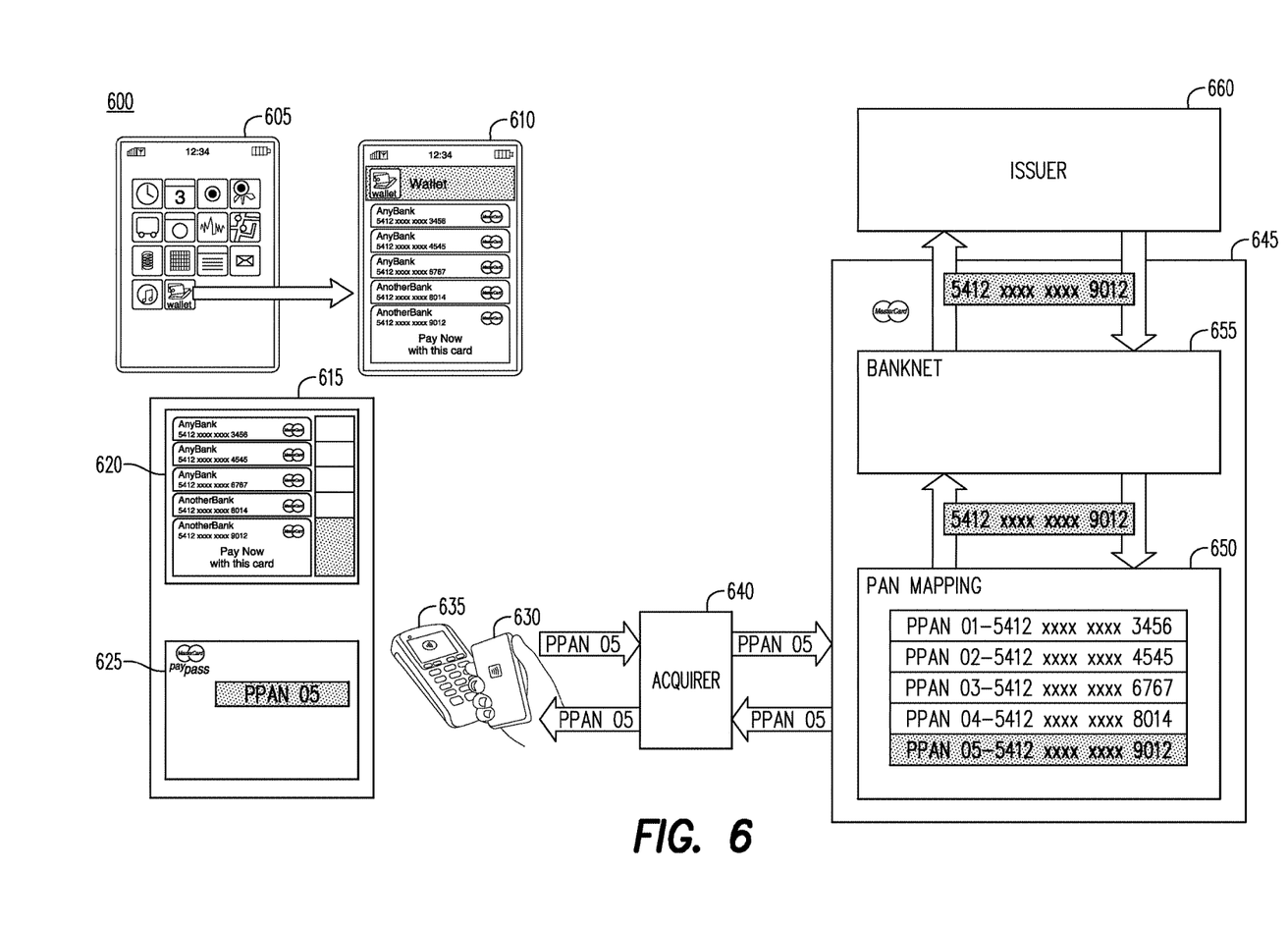
FIG. 6 is an illustrative depiction of a system, according to some embodiments herein.

FIG. 6 is an illustrative depiction of a system 600, in accordance with some embodiments herein. System 600 may support, facilitate, or provide a mechanism wherein an application on a mobile device associates a dynamic PPAN with a PAN for use in a contactless payment transaction. System 600 includes a mobile device 605 having a UI for presenting information to a user and receiving user inputs from the user. Mobile device 605 may have a UI 610 that may be invoked by selecting or opening a wallet app on mobile device 605 in response to a user input. As shown at UI 610, the wallet app presents a display including multiple graphical representations of payment devices that may each represent a credit card or other type of card having a PAN issued to a user by an issuer. In some instances, a user may select a payment device representation presented in UI 610 to indicate the user's choice regarding a "card" to use as a payment device in a future payment transaction. In some aspects, the payment device selected, either by the user or as a function of the wallet app, may be a default payment device that will be used for payment transactions unless another payment device is selected by the user, the wallet app, or another entity (e.g., an issuer).

A logical representation of the wallet app stored in a secure element at mobile device 605 is shown at 615. As illustrated, wallet 615 includes five payment device representations at 620, where each of the payment device representations 620 may be associated with the PPAN 625 for use in a payment transaction. In the example of FIG. 6, a single payment application including a single PPAN is included in the secure element 615. Furthermore, the PPAN 625 may be dynamically changed or updated based on data from, for example, an issuer of PANs associated with the "cards" 620. For example, update data may be distributed to the wallet app in secure element 615 by the issuer at the time the mobile device is deployed or at other times thereafter. The value of the PPAN may depend, at least in part, on the update data. In some embodiments, the update data may be distributed to the mobile device in a file or record and delivered wirelessly (i.e., "over the air") or on some tangible media. In some embodiments, the value of the PPAN will be based on the "card" selected for use in a payment transaction and the update data.

After selecting a desired "card" for a future payment transaction and having such information associated with the PPAN dynamically determined as indicated above, the user may tap or otherwise present mobile device 630 within an operational range of a merchant's POS terminal 635 for the purpose of using the mobile device as a contactless payment device where the selected "card" is used as the payment source for a payment transaction. Upon tapping mobile device on POS terminal 635 a short range communication link is established between mobile device 630 and POS terminal 635. PPAN 625 is sent to merchant's acquirer 640 from the mobile device. Acquirer 640 proceeds to route PPAN 625 and transaction data to a payment network provider 645. In some embodiments, the payment network provider 645 may be MasterCard International. Payment network provider 645 may provide or support a PPAN-PAN mapping service 650. Mapping service 650 may operate to translate PPAN 625 received with the payment transaction data to the PAN associated with the card selected by the user. PPAN 625 dynamically determined by the mobile device is thereby mapped to the particular and actual PAN associated with the user's actual payment card.

The PAN determined by the mapping service 650 may then be included in an authorization request generated and sent from mapping service 650 to issuer 660 via payment network 655. Issuer 660 determines whether the authorization request including the PAN is approved or rejected, based on the PAN, other payment transaction details, and applicable rules of the issuer. An authorization response message is sent from issuer 660 to payment network provider 650, where the authorization response includes the PAN and an indication of whether the authorization request was approved or denied.

The PAN in the authorization response is translated to the PPAN included in the payment transaction data. The PPAN is further included in an authorization response that is provided as an output from payment network provider 645 and routed to POS terminal 635 via the merchant's acquirer 640.

Figure 7:
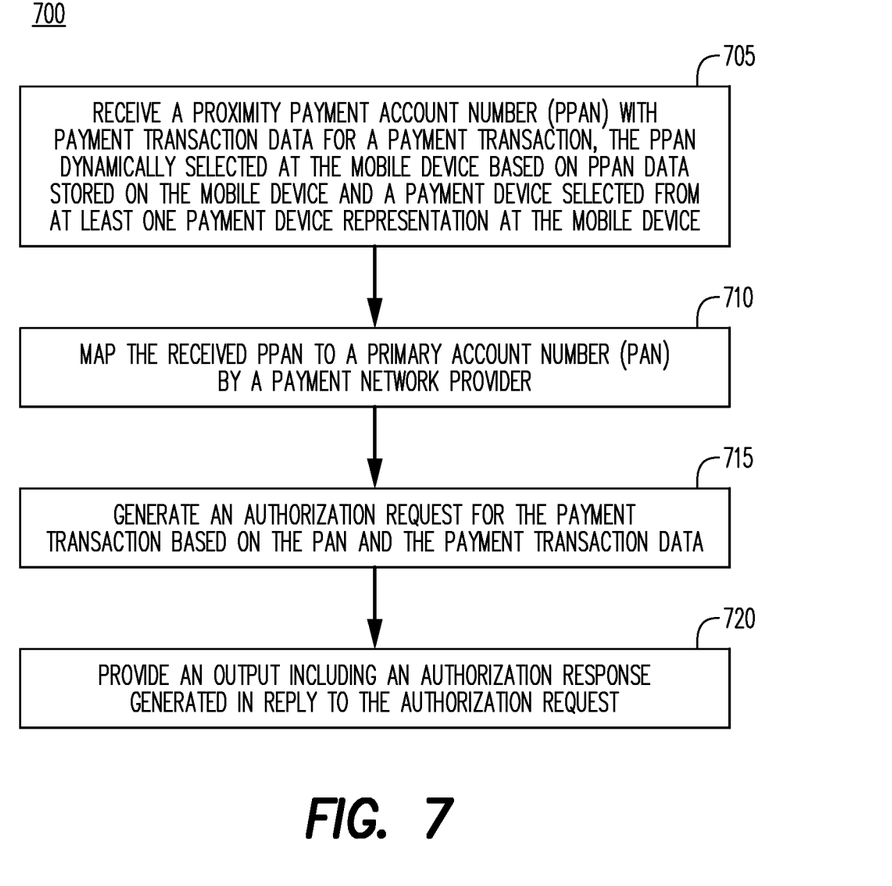
FIG. 7 is flow diagram illustrating a process in accordance with some embodiments herein.

FIG. 7 is an illustrative flow diagram of a process 700 according to some embodiments herein. Process 700 may be implemented by the system depicted in FIG. 6, as well as other systems and devices not specifically shown herein. At operation 705, a PPAN is received along with an indication of a desired payment device (i.e., a "card") to be used in a future payment transaction. In some embodiments, the PPAN is dynamically determined by or at the mobile device based on update data and in some aspects the "card" selected for use with a payment transaction.

At operation 710, the PPAN determined at the mobile device is received in connection with payment transaction data for use in completing the payment transaction and is further mapped or otherwise associated with the PAN corresponding to the "card" selected by the user.

At operation 715, an authorization request for the payment transaction is generated based on the determined PAN and routed to the issuer of the PAN for approval or denial. In reply to the authorization request, the issuer provides an authorization response that is routed to the PPAN-PAN mapping service that operates to translate the PAN included in the authorization response back to the PPAN included in the payment transaction.

At operation 720, the authorization response including the PPAN may provided as an output of the PPAN-PAN mapping service and routed to the merchant's POS. In some aspects, the authorization response may be provided in a message or other data exchange.

Figure 8:
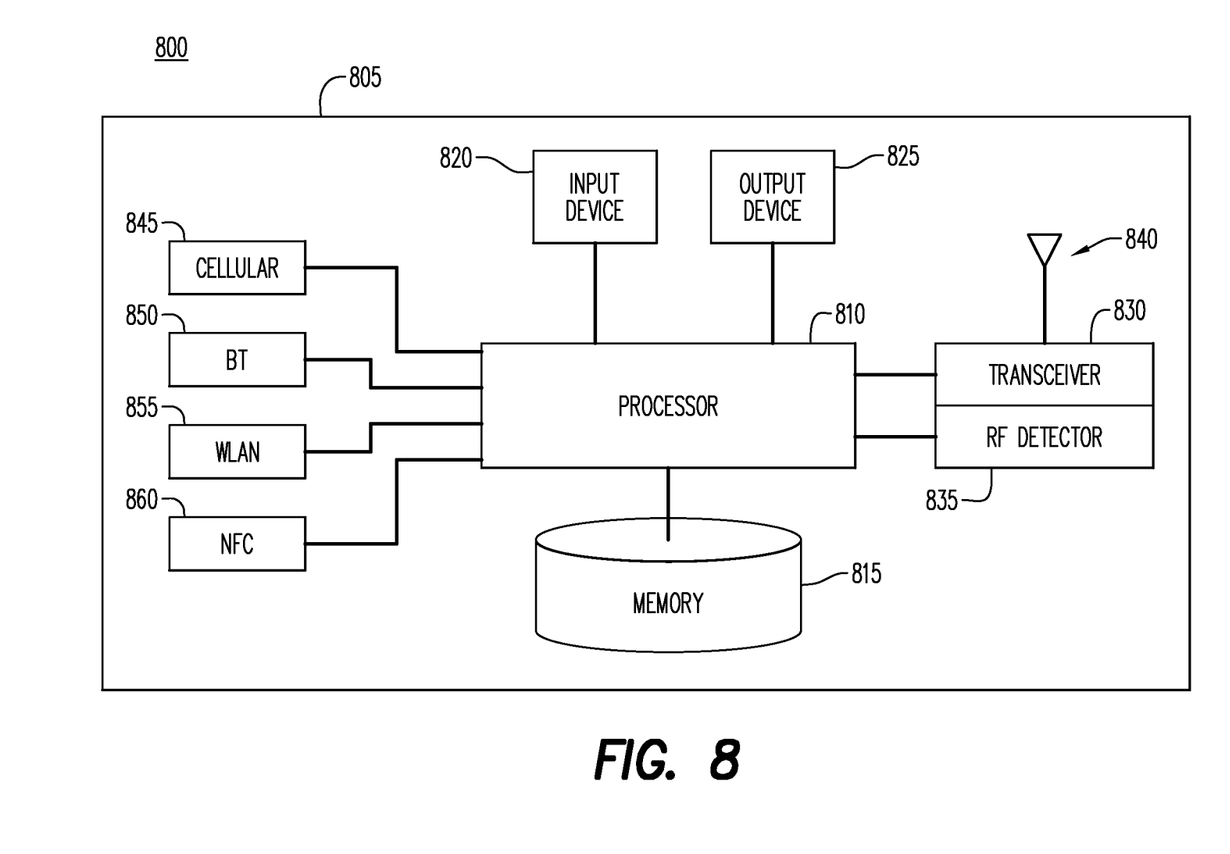
FIG. 8 is block diagram of an apparatus, according to some embodiments herein

FIG. 8 is a block diagram of an apparatus, device, or system 400 for a multifunctional mobile device 805 including a mobile or cellular telephone capability and a short-range wireless communication capability. FIG. 8 does not imply or necessarily represent a physical layout of mobile device 805. In its hardware and in some of its software/firmware, mobile device 805 may be substantially conventional. However, mobile device 805 may include hardware, software, firmware, and combinations thereof to implement and embody aspects of the present disclosure, including the methods and processes herein.

Mobile device 805 may include a conventional housing (not explicitly shown) that contains and/or supports the other components of the mobile telephone. The housing may, for example, be shaped and sized so as to be held in the user's hand. In some embodiments, device 805 may be housed in a device such as a tablet computing device.

Mobile device 805 may include a processor 810 that processes and controls data in the mobile device that is interfaced with a memory 815 and capable of executing program instructions stored in memory 815, a transceiver 830 for transmitting and receiving communication signals to and from antenna 840, and a RF detector 835 comprising part of the transceiver for detecting RF signals. Though not separately depicted in FIG. 8, memory 815 may include or encompass, in various embodiments, random access memory (RAM), read only memory (ROM), a SIM card, flash memory, and other types and forms of data storage devices and media.

Transceiver 850 may be coupled to antenna 840 and connects to the communication channel(s) by which mobile telephone 805 communicates via a mobile network (not shown). The transceiver is in communication with antenna 840 that may serve to transmit and receive wireless wide-range and short-range communication signals. Mobile telephone 805 may also include an input device 820 (e.g., a keypad, keyboard, touchscreen system, voice input components, etc.) for receiving inputs from a user, and an output device 825 (e.g., a speaker, an indicator light, a display, etc.) for providing an output of the mobile telephone to the user or other entities.

In conventional fashion, transceiver 830 operates to transmit, via antenna 840, voice signals received from a user through input device 820, and operates to reproduce, via output device 825 (e.g., a speaker), voice signals received via antenna 840. Transceiver 830 may also further operate to handle transmission and reception of text messages and/or other data communications via antenna 840. In some embodiments, mobile telephone 805 may transmit wireless communication signals in any frequency range and power, including those now used and those that may be used in the future without limit such as, for example, GSM 1900/1800/850 MHz, and other frequencies at a maximum transmit power of about 30 dBM, 33 dBM, and the like.

Mobile telephone 805 may be capable of communicating with another device via cellular telephone signals as provided by a cellular component or module 845 and a variety of short-range communication protocols, such as Bluetooth® as provided by a Bluetooth® module 850, by a wireless local area network (e.g., Wi-Fi, based on IEEE 802.11 b/g/n or other standards) as provided by a WLAN module 855, and by NFC signals as provided by NFC module or components 860 or the like.

In some embodiments, mobile telephone 805 may be a NFC-enabled mobile telephone equipped to operate as a secure proximity payment device and interact/communicate with another device (not shown in FIG. 8) such as a ticket kiosk/device and a contactless-POS terminal or other device that may include a radio frequency identification ("RFID") tag. In some embodiments, the contactless-POS or other device and mobile telephone 805 may typically be positioned in close proximity of each other when communicating using NFC signals. In some aspects, the contactless-POS or other device and mobile telephone 805 may be within about 0-10 millimeters of each other in order for a RF power field generated by either the mobile telephone and the contactless-POS terminal or other device to transfer data therebetween.

It is noted that the short-range communication platform used for communication between mobile telephone 805 and other devices may be any acceptable platform operating in any acceptable frequency band. For example, Bluetooth® or WLAN communications that operate in the 2.4 GHz frequency band, may be implemented. Communication is not however limited to the 2.4 GHz frequency band and may include communication in the 900 MHz frequency band, the 5.8 GHz frequency band, the 13.56 MHz frequency band or the like.

In some embodiments, the methods and processes herein, including the functionality and operation of a mobile telephone or other wireless communication mobile device in accordance with the methods and processes herein may be included, supplied, or otherwise provisioned with the mobile telephone or other wireless communication mobile device to operate independently of any other features of the mobile telephone or other wireless communication mobile device.

Figure 9:
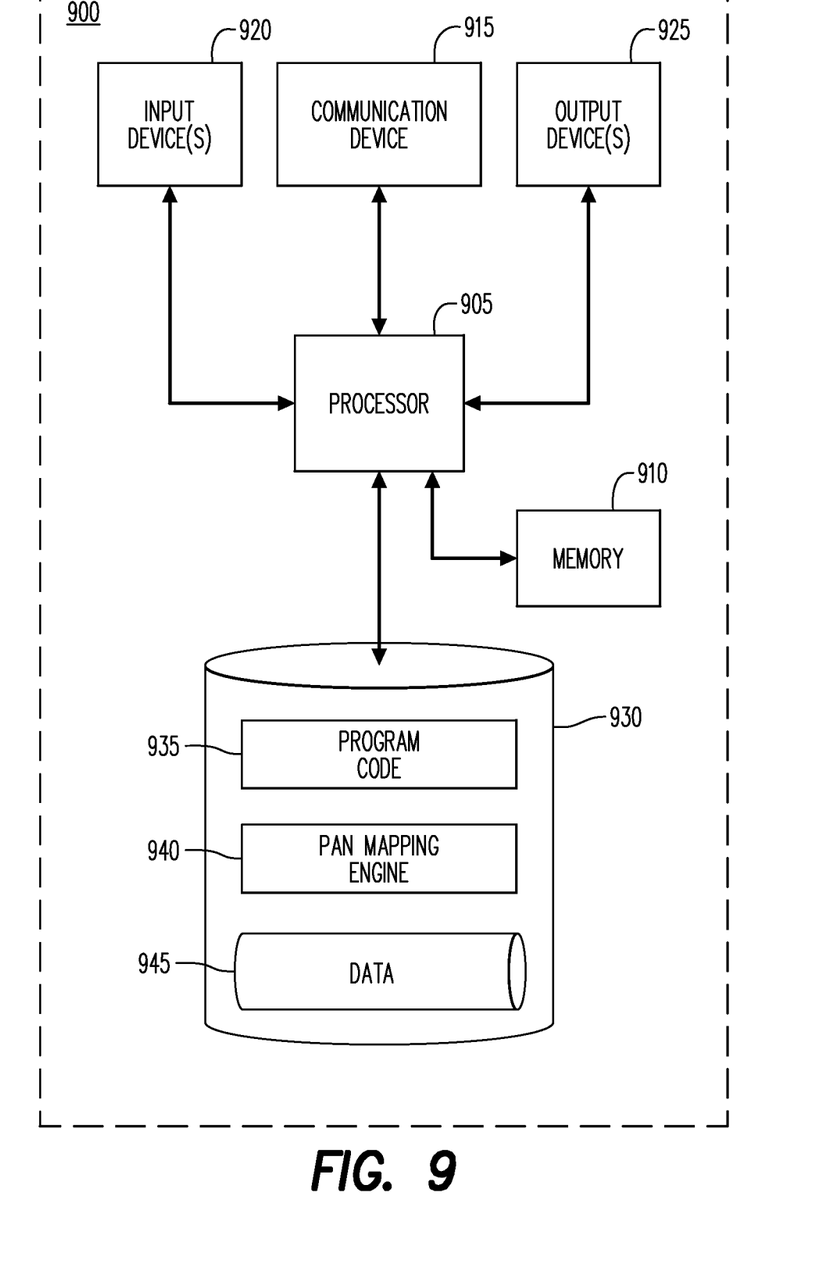
FIG. 9 is schematic diagram of an apparatus, according to some embodiments herein.

FIG. 9 is a block diagram overview of a system or apparatus 900 according to some embodiments. System 900 may be, for example, associated with any of the devices described herein, including for example a merchant POS device 135, 435, and 635 and an application server supporting or providing a payment network provider 145, 450, and 645. The system 900 comprises a processor 905, such as one or more commercially available Central Processing Units (CPUs) in the form of one-chip microprocessors or a multi-core processor, coupled to a communication device 915 configured to communicate via a communication network (not shown in FIG. 9) to another device or system. In the instance system 900 comprises an application server (e.g., payment network provider 145, 450, and 645), communication device 915 may provide a means for system 900 to interface with a client device (e.g., POS devices 135, 435, 635, and mobile device 405). Device 900 may also include a local memory 910, such as RAM memory modules. The system 900 further includes an input device 920 (e.g., a touchscreen, mouse and/or keyboard to enter content) and an output device 925 (e.g., a computer monitor to display a user interface element).

Processor 905 communicates with a storage device 930. Storage device 930 may comprise any appropriate information storage device, including combinations of magnetic storage devices (e.g., a hard disk drive), optical storage devices, and/or semiconductor memory devices. In some embodiments, storage device may comprise a database system.

Storage device 930 stores program code 935 that may provide computer executable instructions for processing requests from, for example, POS devices and mobile devices in accordance with processes herein. Processor 905 may perform the instructions of the program code 935 to thereby operate in accordance with any of the embodiments described herein. Program code 935 may be stored in a compressed, uncompiled and/or encrypted format. Program code 935 may furthermore include other program elements, such as an operating system, a database management system, and/or device drivers used by the processor 905 to interface with, for example, peripheral devices. Storage device 930 may also include a PAN mapping engine 940 and data 945 such as database records or look-up tables. The PAN mapping engine 940 may execute program instructions or code to perform the operation(s) of mapping or translating a PPAN to a PAN as discussed herein with regard to, for example, the PAN mapping service of FIGS. 1-7. Data 940 may be used by system 900, in some aspects, in performing the processes herein, including the PPAN-PAN mapping services.

All systems and processes discussed herein may be embodied in program code stored on one or more computer-readable media. Such media may include, for example, a floppy disk, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
receiving, by a mobile device, an indication of a user-selected payment device representation displayed to a user by the mobile device;
presenting the mobile device within a wireless operational range of a proximity reader, the mobile device operating as a contactless payment device;
receiving, by a processor, a proximity payment account number (PPAN) and payment transaction data for a payment transaction from the mobile device, the PPAN corresponding to the user-selected payment device representation and being enabled for use in a contactless payment system including the contactless payment device and the proximity reader and being selected from a plurality of proximity payment account numbers (PPANs) stored on the mobile device and;
mapping, by the processor, the received PPAN to a primary account number (PAN, the PPAN being not the same as the PAN;
generating, by the processor, an authorization request for the payment transaction based on the PAN and the payment transaction data;
receiving, by the processor, an authorization response determined in reply to the authorization request, the authorization response including an indication of whether the authorization request is approved or denied;
providing, by the processor, an output including the authorization response and the PPAN; and
transmitting the output including the authorization response to the proximity reader.

2. The method of claim 1, wherein the mobile device is a mobile telephone.

3. The method of claim 1, wherein each of the plurality of PPANs corresponds to one of a plurality of payment device representations at the mobile device.

4. The method of claim 3, wherein the selected PPAN corresponds to a selection of one of the plurality of payment device representations at the mobile device.

5. The method of claim 1, wherein the PAN is associated with at least one of a credit card account, a charge card account, a debit card account, a stored value card account, a rewards program account, a remittance account, and a loyalty program account.

6. The method of claim 1, wherein the plurality of PPANs are stored in a secure element of the mobile device.

7. A method comprising:
receiving, by a mobile device, an indication of a user-selected payment device representation displayed to a user the mobile device;
presenting the mobile device within a wireless operational range of a proximity reader, the mobile device operating as a contactless payment device;
receiving, by a processor, the indication of the user-selected payment device to associate with a future purchase transaction from the mobile device, the indicated payment device being selected from at least two payment device representations at the mobile device;
receiving a proximity payment account number (PPAN) with payment transaction data for a payment transaction from the mobile device, the PPAN corresponding to the user-selected payment device representation and being enabled for use in a contactless payment system including the proximity payment device and the proximity reader;
mapping, by the processor, the received PPAN to a primary account number (PAN) associated with the indicated payment device, the PPAN being not the same as the PAN;
generating, by the processor, an authorization request for the payment transaction based on the PAN and the payment transaction data;
receiving, by the processor, an authorization response in reply to the authorization request, the authorization response including an indication of whether the authorization request is approved or denied;
providing, by the processor, an output including the authorization response and the PPAN; and
transmitting the output including the authorization response to the proximity reader.

8. The method of claim 7, wherein the mobile device is a mobile telephone.

9. The method of claim 7, wherein each of the at least one payment device representation at the mobile device may be selectively associated with the PPAN.

10. The method of claim 7, wherein the PPAN and the indication of the payment device are received from the mobile device, at least in part, via a wireless communication network.

11. The method of claim 7, wherein the PAN is associated with at least one of a credit card account, a charge card account, a debit card account, a stored value card account, a rewards program account, a remittance account, and a loyalty program account.

12. The method of claim 7, wherein the PPAN is stored in a secure element of the mobile device.

13. A method comprising:
receiving, by a mobile device, an indication of a user-selected payment device representation displayed to a user by the mobile device;
presenting the mobile device within a wireless operational range of a proximity reader, the mobile device operating as a contactless payment device;
receiving, by a processor, a proximity payment account number (PPAN) and payment transaction data for a payment transaction from the mobile device, the PPAN corresponding to the user-selected payment device representation and being enabled for use in a contactless payment system including the contactless payment device and the proximity reader and being dynamically selected at the mobile device based on PPAN data stored on the mobile device and a payment device representation selected from at least two payment device representations at the mobile device;
mapping, by the processor, the received PPAN to a primary account number (PAN), the PPAN being not the same as the PAN;
generating, by the processor, an authorization request for the payment transaction based on the PAN and the payment transaction data;
receiving an authorization response determined in reply to the authorization request, the authorization response including an indication of whether the authorization request is approved or denied;
providing, by the processor, an output including the authorization response and the PPAN and
transmitting the output including the authorization response to the proximity reader.

14. The method of claim 13, wherein the mobile device is a mobile telephone.

15. The method of claim 13, wherein each of the at least one payment device representations at the mobile device may be selectively associated with the PPAN.

16. The method of claim 13, wherein the dynamic selection of the PPAN comprises generating the PPAN at the mobile device.

17. The method of claim 13, wherein the PAN is associated with at least one of a credit card account, a charge card account, a debit card account, a stored value card account, a rewards program account, a remittance account, and a loyalty program account.

18. The method of claim 13, wherein the PPAN are stored in a secure element of the mobile device.

19. The method of claim 13, wherein the PPAN dynamically selected at the mobile device based on PPAN data stored on the mobile device and a payment device selected from at least one payment device representation at the mobile device.

* * * * *